March 5, 1968     N. DUCHESNE     3,371,556

TRANSMISSION MECHANISM

Filed Dec. 6, 1966     3 Sheets-Sheet 1

INVENTOR
Normand DUCHESNE

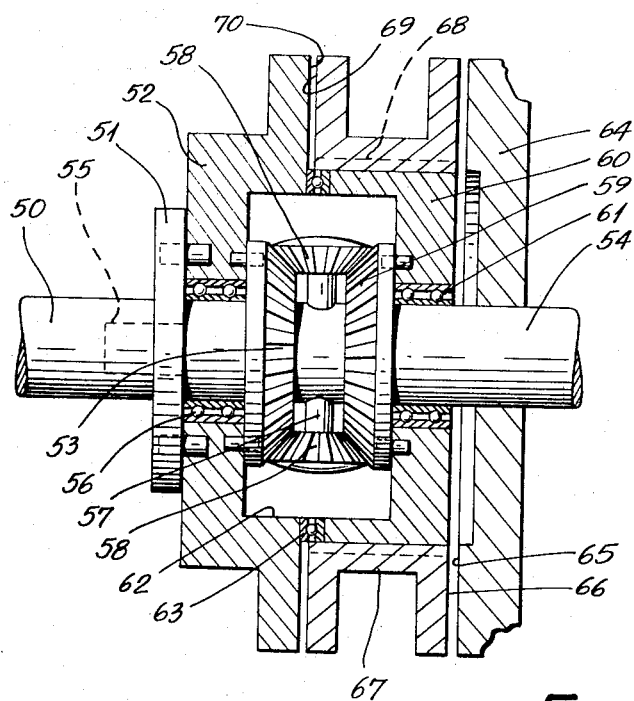
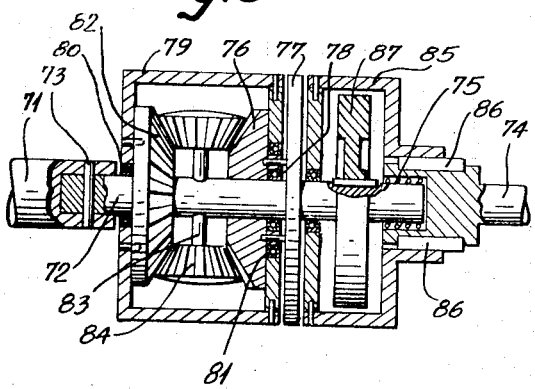
Fig. 4
Fig. 5

_United States Patent Office_ 3,371,556
Patented Mar. 5, 1968

3,371,556
TRANSMISSION MECHANISM
Normand Duchesne, 335 Tessier St., La Tuque,
Quebec, Canada
Continuation-in-part of application Ser. No. 402,502,
Oct. 8, 1964. This application Dec. 6, 1966, Ser.
No. 599,464
7 Claims. (Cl. 74—777)

ABSTRACT OF THE DISCLOSURE

A transmission mechanism comprising two pairs of gears mounted to rotate on mutually transverse interconnected shafts with both gears of one pair of gears meshing with both gears of the other pair of gears, a second shaft coaxial with one of said mutually transverse shafts, and a clutch to selectively prevent rotation of one gear on one of said coaxial shafts and the other gear being fixed to one of said coaxial shafts and means to selectively connect said one gear to one of said coaxial shafts for rotation therewith thereby to vary the output of the transmission.

---

This application is a continuation-in-part of copending application Ser. No. 402,502, filed Oct. 8, 1964, now abandoned.

The present invention relates to transmissions, more particularly to a transmission mechanism specially adapted for use in power transmission mechanisms such as outboard motors or the like.

One of the major shortcomings of outboard marine engines is their inability to operate efficiently at low r.p.m. On many occasions, as for example when fishing, it is desirable to travel at relatively low speeds, however, when outboard motors are slowed to the low r.p.m. they run rough and very inefficiently and consume extra fuel. Thus for low speed operation conventional outboard motors are generally unsatisfactory.

It is the main object of the present invention to provide a new transmission mechanism that is relatively inexpensive to manufacture and is particularly suitable for use with outboard marine engines.

Broadly, the present invention comprises a first shaft and a second shaft, a first gear rotatable with said first shaft, a second gear mounted on and rotatable relative to said second shaft, a transverse shaft means secured to and extending substantially perpendicular to said second shaft, a pinion rotatably mounted on said transverse shaft means, said pinion meshing with said first and second gears, releasable means to lock said second gear for rotation with said second shaft and a second releasable means to prevent said second gear from rotation.

Figure 1:
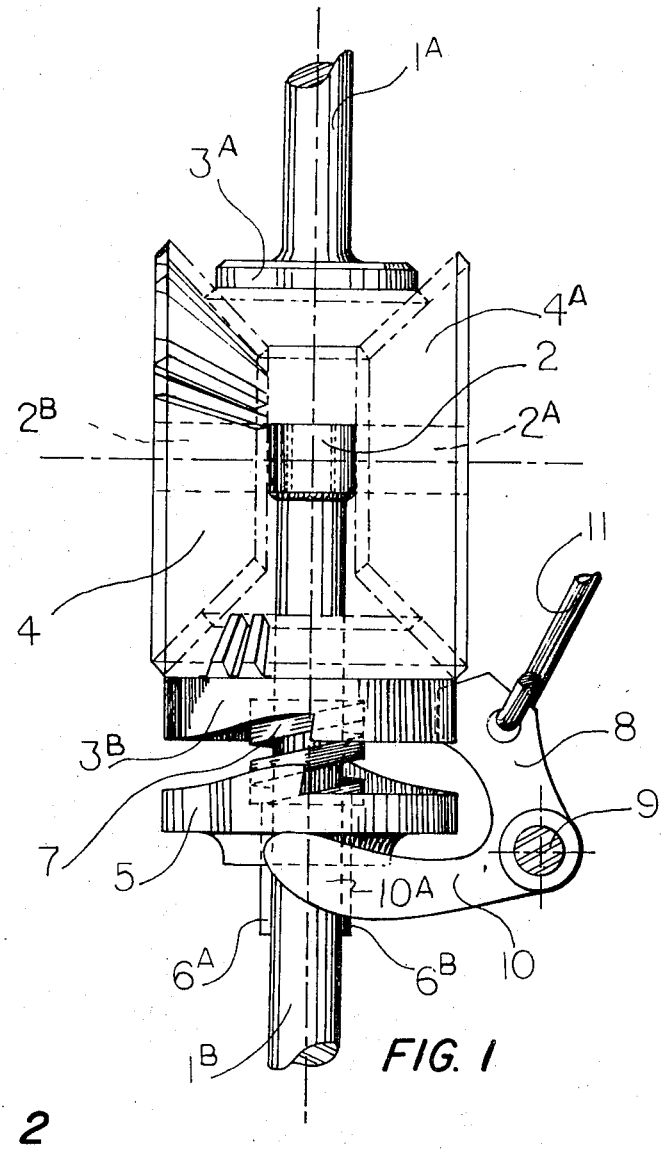
Figure 2:
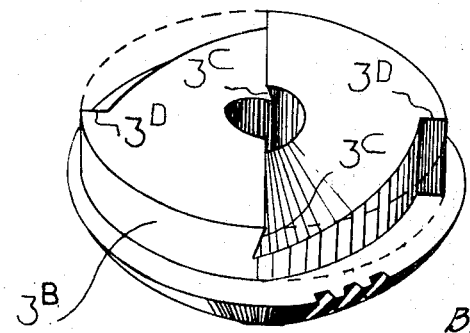
Figure 3:
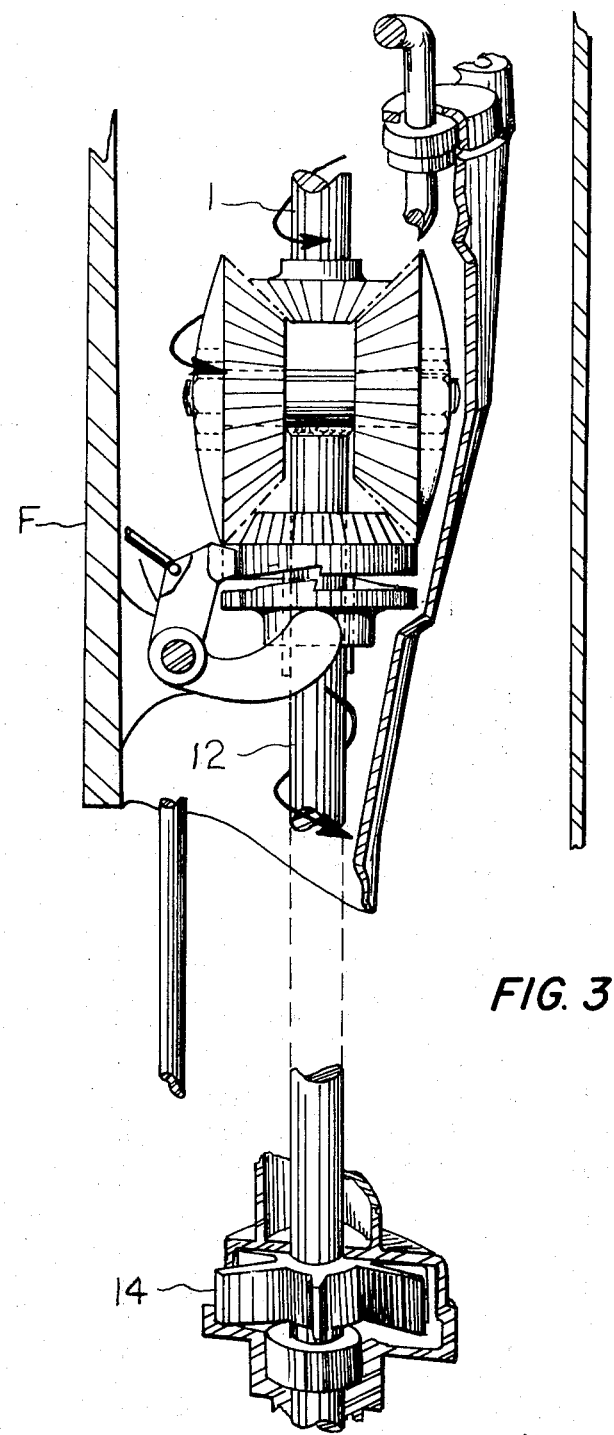

Further features, objects and advantages will be evident from the following detailed description taken in conjunction with the accompanying drawings in which:

FIGURE 1 is a view of the transmission of the present invention in power drive position, FIGURE 2 is an end view of one of the gears of the transmission, FIGURE 3 illustrates the present transmission incorporated in an outboard motor, parts having been broken away and omitted for clarity, FIGURE 4 is a cross-section of a second embodiment illustrating a power drive, neutral and direct drive, and FIGURE 5 is a cross-section of a third embodiment illustrating an overdrive, neutral and direct drive.

As shown in FIGURE 1 the transmission of the present invention has an input shaft 1A and an output 1B. Secured to the shaft 1B by welding or the like is a hub 2 having a pair of oppositely extending transverse shafts 2A and 2B. Connected to the shaft 1A is a first gear 3A and freely rotatably mounted on the shaft 1B but prevented from axial movement by suitable bearing is a second gear 3B. A pair of pinions 4A and 4 are freely rotatably mounted, but prevented from axial movement, on transverse stub shafts 2A and 2B respectively. Gear 3A meshes with the pinions 4A and 4 which pinions in turn mesh with the gear 3B.

The gear 3B as illustrated in FIGURE 2 has a pair of clutching members, one on the rear face and the other on the periphery thereof. On the rear face of the gear 3B (i.e. the side remote from shaft 1A) are a pair of abutment surfaces 3C adapted for driving engagement with a pair of co-operating abutment edges 5C on clutch plate 5 which will be described more fully hereinafter. On the periphery of the gear 3B is a second pair of abutment surfaces 3D adapted to engage a locking pawl 8 on shift lever 10.

Clutch plate 5 which mates with the clutch provided by surfaces 3C on gear 3B is keyed to shaft 1B via a pair of keys 6A and 6B which permit the plate 5 to slide axially on the shaft 1B but prevent relative rotational movement. As shown in FIGURE 1 interposed between mating elements 3B and 5 is a spring 7 which fits within sockets provided in these elements and biases them to open or disengage position.

Pivoted on the frame F shown in FIGURE 3 via pivot pin 9 is a shifting lever 10. This lever 10 has a forked end providing a pair of arms 10A (only one shown) which straddle shaft 1B and engage the rear surface of the clutch plate 5. The opposite end of the lever 10 is provided with the locking pawl 8 referred to above. Shift lever 10 is moveable via rod 11 from a first position as shown in FIGURE 1 wherein locking pawl 8 engages one of the surfaces 3D and prevents rotation of gear 3B and a second position (not shown) wherein pawl 8 clears the surfaces 3D and frees the gear 3B for rotation. In this second position the gear 3B is clutched via plate 5 in driving engagement with shaft 1B. A third or intermediate position may also be provided as indicated hereinbelow.

In operation, shaft 1A is driven and this shaft in turn rotates gear 3A which meshes with the pinions 4A and 4. When the shift lever 10 is in the first position locking gear 3B to the frame F as shown in FIGURE 3 the shaft 1B is driven at reduced speed via gear 3A, pinions 4A and 4 rotating around gear 3B and through transverse shafts 2A and 2B. The arrangement provides a power drive and permits to operate at higher r.p.m. for the same speed of the propeller of the outboard motor, thereby permitting more efficient operation.

During normal operation shift lever 10 is moved to the second position wherein gear 3B is free to rotate, but is locked to the shaft 1B via clutch plate 5 and keys 6A and 6B. In this position the shaft 1A rotates gear 3A which engages pinions 4A and 4 which in turn engages gear 3B, however, because pinions 4A and 4 and gear 3B are all locked to rotate with shaft 1B there can be no relative movement between these pinions 4A and 4 and gear 3B. The turning of gear 3A directly drives shaft 1B via cross shafts 2A and 2B, gear 3B, clutch plate 5 and keys 6A and 6B.

The above description has been directed to one specific embodiment of the instant invention, others will be evident to those skilled in the art, for example, the mating edges 3C and 5C may be replaced with suitable friction clutch means and similarly the positive locking surface 3D and pawl 8 may be replaced by other suitable clutching means. For example, if the transmission is to be used with a forward and a reverse drive the clutch mechanism must be adapted to operate regardless of the rotational direction.

Referring briefly to FIGURE 3 there is shown the housing frame F of an outboard motor, mounted within the housing F is the transmission mechanism described above, shaft 1 in FIGURE 3 is equivalent to shaft 1A of FIGURE 1 and is the driven shaft of the outboard motor and shaft 12 is equivalent to shaft 1B of FIGURE 1. Shaft 12 drives water pump 14 and the propeller (not shown) of the outboard motor.

The transmission of the present invention need not be located as above described, but may be positioned in any suitable location. Also the instant transmission can readily be adapted as clutch or neutral position for the outboard motor or the like simply by providing a third position of selector lever 10. This third position intermediate to the first and second positions will leave the gear 3B free to rotate relative to the frame F and the shaft 1B whereby no power will be transmitted to the shaft 1B thereby providing a disengaged position of a clutch.

The second embodiment shown in FIGURE 4 is a combined direct drive, neutral and power drive. The input shaft 50 is rigidly secured to a disc 51, in turn rigidly secured to a step-shaped flange 52.

Bevelled gear 53 is also secured to flange 52 and, therefore, to the input shaft 50 and rotates therewith at the same speed. An output shaft 54 is in axial alignment with the input shaft 50 and has a reduced end portion 55 rotatably mounted within an end cavity of shaft 50.

Flange 52 is rotatably mounted on output shaft 54 by means of ball bearings 56. Gear 53 rotates freely on output shaft 54. A cross shaft 57 is inserted through a transverse bore of output shaft 54 and extends equally on both sides thereof.

Bevelled pinions 58 are rotatably mounted on the ends of cross shaft 57 and mesh with gear 53 and also with an opposite gear 59, which is secured to a cup-shaped flange 60, which is disposed adjacent to stationary frame member 64 equivalent to frame F of the first described embodiment. Output shaft 54 is journalled in and passes through the gear 59, flange 60 and frame 64.

Frame member 64 has a clutching surface 65 which is disposed opposite the clutching surface 66 of a ring member 67. Said ring member 67 has preferably a U-shaped cross-section, surrounds flange 60 and is keyed thereto by means of keys 68 for axial displacement with respect to the same, but is driven into rotation with said flange 60. Ring member 67 has a second annular clutching surface 69 disposed opposite a clutching surface 70 of step flange 52. An actuator member, not shown, rotatably engages the ring member 67 and can control the axial position of the same. Said ring member 67 has three positions, namely: a left hand position for direct drive; a central position for neutral; and a right hand position for power drive.

In the left hand direct drive position, surface 69 of ring member 67 is in clutching engagement with surface 70 of flange 52. Therefore, input shaft 50, which always drives left gear 53 at the same speed, also drives ring member 67 which in turn drives flange 60 and the associated gear 59 at the same speed, the two gears being rotated at the same speed and in the same direction.

The pinions are locked and transmit the same rotational movement to the output shaft 54 through cross shaft 57.

In the neutral position wherein ring member 67 releases both the frame member 64 and the stepped flange 52, cup-shaped flange 60 and therefore gear 59 are free to rotate, but are declutched from output shaft 54. Therefore, there is no power transmitted from the input to the output shaft.

In the right hand position of the ring member 67, the latter is clutched to stationary frame member 64 and, therefore, maintains gear 59 stationary. The input shaft 50 rotates gear 53, which rotates pinions 58 against stationary gear 59. Therefore, the pinions effect a rotational movement at half the speed of the input shaft 50. These pinions in turn rotate the output shaft 54 at half the speed of the input shaft, resulting in a power drive with a 2 to 1 speed ratio.

FIGURE 5 shows an arrangement wherein an overdrive, a direct drive and a neutral state are obtained. Input shaft 71 is rigidly connected to transmission shaft 72 through cross pin 73. Transmission shaft 72 has its outer end rotatably mounted in an end cavity of output shaft 74 by means of ball bearings 75.

A bevelled gear 76 is rigidly secured to a disc 77 and both said elements are rotatably mounted on transmission shaft 72 by means of ball bearing 78.

A cylindrical casing 79 is mounted in a stationary manner by means of brackets or the like, not shown, and is therefore non-rotatable. The transmission shaft 72 passes through said casing 79 and is rotatable therein by means of ball bearing 80 and ball bearings 81 and 78.

A bevelled gear 82 is rigidly secured to casing 79 and is disposed inside thereof together with crown gear 76, the two gears spacedly facing each other.

A cross shaft 83 passes through a transverse bore of transmission shaft 72 and is secured thereto and extends equally on both sides thereof. Bevelled pinions 84 are rotatably mounted on cross shaft 83 and mesh with the gears 76 and 82.

A cylindrical box 85 is rotatably and slidably mounted on transmission shaft 72 and is mounted for axial displacement on output shaft 74, but is driven in rotation thereby. Keys 86 engage cylindrical box 85 and output shaft 74, but allow axial displacement of the box with respect to the output shaft.

A clutching wheel 87 is mounted within cylindrical box 85 on transmission shaft 72 and is secured thereto.

As noted before, casing 79 is held stationary by suitable means, not shown. Cylindrical box 85 is axially movable by an actuator member, not shown, between three positions, namely: a left hand position for overdrive, a central position for neutral and a right hand position for direct drive.

In the left hand position of the cylindrical box 85, its inner radial face clutches with the disc 77, but the box clears the clutching wheel 87.

The left hand gear 82 is held stationary and rotation of the input shaft rotates the transmission shaft secured thereto which in turn rotates the cross shaft 83 at the same speed as the input shaft.

The pinions 84 are rotated about the cross shaft 83 because they engage the stationary gear 82 and they cause rotation of the right hand gear 76 at double the speed of the input shaft.

Gear 76 rotates disc 77, which in turn rotates cylindrical box 85 clutched thereto and the latter rotates the output shaft 74 at twice the speed of the input shaft, resulting in an overdrive of a speed ratio of 1 to 2.

In the central position of cylindrical box 85, said box is declutched from disc 77 and, therefore, although the right hand bevelled gear 76 rotates at twice the speed as that of the input shaft, there is no power transmitted to the output shaft, because the cylindrical box is declutched from the disc and also from the clutching wheel 87.

In the right hand position of the cylindrical box, the left hand bevelled gear 82 being stationary, right hand bevelled gear 76 rotates at twice the speed of the input shaft 71, but disc 77 is declutched from the cylindrical box 85, thus the gear train is not effective. However, the input shaft drives directly the transmission shaft 72 which drives the clutching wheel 87, which in turn is in clutching engagement with box 85 and the latter drives the output shaft at the same speed as that of the input shaft. The latter embodiment has been described as an overdrive transmission simply to illustrate the versatility of the transmission. If shaft 74 were made the input shaft and shaft 71 the output shaft, a transmission suitable for use in outboard motors as above described will be obtained. Similarly, when the input and output shafts of the other embodiment disclosed are reversed, overdrive transmission will be obtained.

The gear arrangement is very effective for transmitting power while obtaining a demultiplication of the speeds of the input and output shafts. Because the pinions are mounted at the end of the cross shaft and the latter acts as a lever, they transmit less force than the force actually transmitted at the shafts themselves, thus the pinions and gears have a very long life relatively to their size and/or their composition.

The input and output shafts being in axial alignment, the unit in accordance with any one of the embodiments of the invention can be placed directly in a drive line and the unit takes a minimum of room.

While preferred embodiments in accordance with the invention have been illustrated and described, it is understood that various modifications may be resorted to without departing from the spirit and scope of the appended claims.

I claim:

1. A transmission mechanism comprising a first shaft and a second shaft, a first gear rotatable with said first shaft, a second gear mounted on and rotatable relative to said second shaft, a transverse shaft means secured to and extending substantially perpendicular to said second shaft, a pinion mounted on said transverse shaft means, said pinion meshing with said first and said second gears, a first releasable means for locking said second shaft and said second gear together, and a second releasable means for preventing rotation of said second gear.

2. A transmission as defined in claim 1, further comprising a second pinion mounted on said transverse shaft, means on the opposite side of said second shaft to said pinion, said second pinion meshing with said first and said second gear.

3. A transmission as defined in claim 1, wherein said first releasable means comprises a first clutching means connected to said second shaft, a second clutching means connected to said second gear, and means for moving said first and said second clutching means into and out of engagement.

4. A transmission as defined in claim 1, wherein said second releasable means comprises a first clutch surface on said second non-rotatable gear and a second clutch surface, and means for engaging and for disengaging said first and second clutch surfaces.

5. A transmission as defined in claim 1, wherein said first releasable means comprises a clutching means connected to said second gear and a second clutching means connected to said second shaft and means for moving said first and said second clutching means into and out of engagement and wherein said second releasable means comprises a first clutch surface on said second gear and a second clutch non-rotatable surface and means for engaging and for disengaging said first and said second clutch surfaces.

6. A transmission mechanism comprising a first and a second gear spaced from one another, a central shaft co-axial with said gears, a cross shaft secured to said central shaft and extending on both sides of the latter in the space between said first and second gears, pinions freely rotatably mounted on said cross shaft, on opposite sides of said central shaft and in meshing engagement with said first and second gears, a second shaft co-axial with and rotatable with respect to said central shaft, a first clutching member having a first clutching surface and secured to said second shaft, said first gear secured to said second shaft, a stationary frame member having a second clutching surface axially spaced from said first clutching surface, said second gear being rotatable on said central shaft, clutching means mounted between said first and second clutching surfaces, said clutching means being connected to rotate with said second gear but being axially moveable with respect thereto, said clutching means having opposed clutching surfaces selectively engageable with said first and second clutching surfaces whereby said second gear is maintained stationary when said clutch means engages said second clutching surface, said first and second gears are locked together when said clutching means engages said first clutching surface, and said second and central shafts are completely disconnected when said clutching means clears said first and second clutching surfaces.

7. A transmission mechanism comprising a first and a second gear spaced from one another, a central shaft co-axial with said gears, a cross shaft secured to said central shaft and extending on both sides of the latter in the space between said first and second gears, pinions freely rotatably mounted on said cross shaft, on opposite sides of said central shaft and in meshing engagement with said first and second gears, a second shaft co-axial with and rotatable with respect to said central shaft, said first gear being stationarily mounted, a first clutching member secured to said second gear, said first clutching member and said second gear being rotatably mounted on said central shaft, a second clutching member secured to said central shaft and axially spaced from said first clutching member, and a third clutching member having a driving connection with said second shaft, but axially displaceable relative to the same, said third clutching member having a first position in clutching engagement with said first clutching member and clearing said second clutching member, a second position clearing said first and said second clutching members, and a third position clearing said first clutching member and in clutching engagement with said second clutching member.

References Cited
UNITED STATES PATENTS

| | | | |
|---|---|---|---|
| 2,027,640 | 1/1936 | Hartl | 74—777 |
| 2,990,728 | 7/1961 | Grenier | 74—777 X |

DONLEY J. STOCKING, *Primary Examiner.*

L. H. GERIN, *Assistant Examiner.*